Aug. 20, 1940.  C. R. RANEY ET AL  2,211,909
FRONT END CONSTRUCTION FOR MANURE SPREADERS
Filed May 25, 1939  2 Sheets-Sheet 1
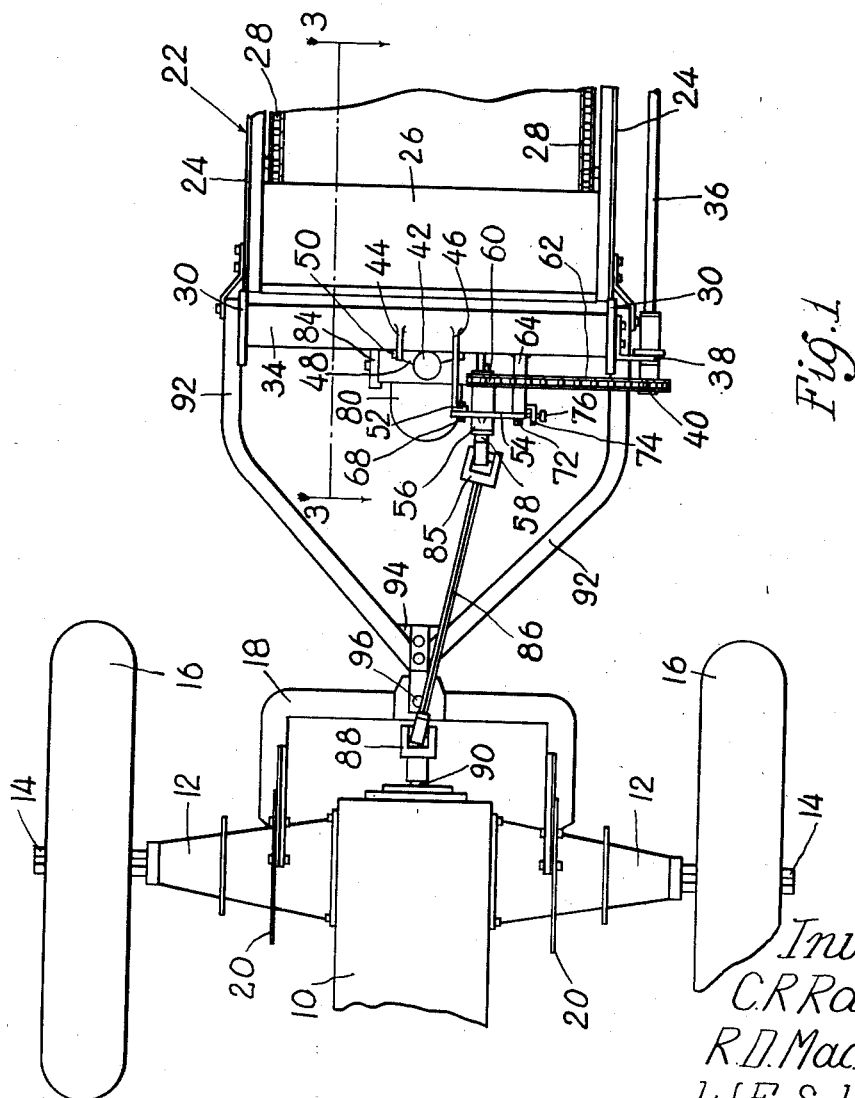
Inventors
C.R. Raney
R.D. MacDonald
W.F. Schmied
By Paul O. Pippel
Atty.

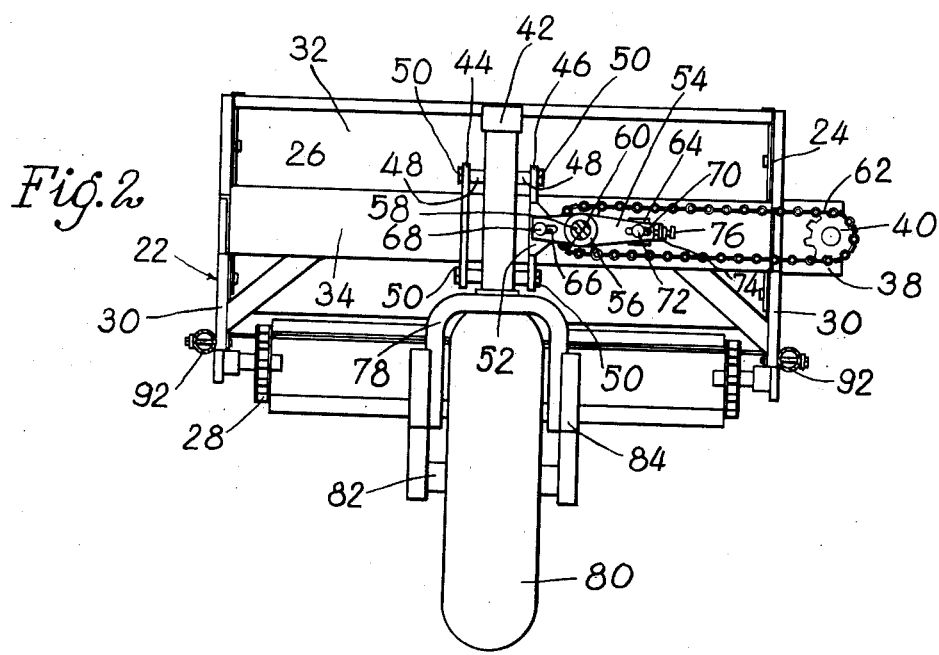

Patented Aug. 20, 1940

2,211,909

UNITED STATES PATENT OFFICE 2,211,909

FRONT END CONSTRUCTION FOR MANURE SPREADERS

Clemma R. Raney, Riverside, Raymore D. MacDonald, Western Springs, and William F. Schmied, Blue Island, Ill., assignors to International Harvester Company, a corporation of New Jersey Application May 25, 1939, Serial No. 275,602

3 Claims. (Cl. 180—14)

This invention relates to an improved front end and caster wheel construction providing a forecarriage for a vehicle, and particularly for a material spreader having a main body support at its rear end in the conventional manner and supported at its forward end by the improved forecarriage construction according to the present invention.

In vehicles of the type which is adapted to be connected behind draft vehicles, there is usually involved considerable expense in designing suitable ground supports for the drawn vehicle. In many instances the forward end of such a vehicle is supported on the rearward end of the draft vehicle. This construction is unsatisfactory when the drawn vehicle is possessed of great weight and when the draft vehicle is not adapted to carry such weight, and especially is this true of material spreaders when loaded. Other constructions have adopted the use of expensive, steerable front wheels which prove unsatisfactory in that the spreader is not easily handled. Various other difficult problems arise in the arrangement of driving parts where the spreader is of the type having its spreading mechanism connected to the draft vehicle power take-off.

The principal object of the present invention is to provide an improved forecarriage construction for a vehicle and especially for a material spreader.

An important object is to provide a simplified front end construction including a single caster wheel.

Another important object is to provide means for connecting the spreader to a draft vehicle independently of the caster wheel.

Another object is to provide simple and novel means for supporting various drive parts for establishing driving connection between the spreading mechanism and the draft vehicle power take-off.

Briefly and specifically these and other important objects are achieved in one preferred embodiment of the invention wherein the improved forecarriage construction is provided on a material spreader, the spreader having a main body provided with opposite side walls and a rearwardly and downwardly inclined front wall. The forecarriage construction includes forwardly extending extension members rigidly carried respectively by the side walls, between which members and rigidly secured at its opposite ends thereat is a transverse bolster member which serves to have journaled thereon a caster wheel. Draft means are provided for connecting the spreader to the draw-bar of a tractor or other draft vehicle, the draft means being connected to the extension members independently of the caster wheel.

A further understanding of the objects and desirable features of the invention may be more completely had from the following detailed description taken in conjunction with the accompanying sheets of drawings, in which:

Figure 1 is a plan view of the improved forecarriage construction for a material spreader shown connected to the draw-bar of a tractor;

Figure 2 is a front elevational view of the forecarriage construction; and,

Figure 3 is a longitudinal sectional view of the same taken on the line 3—3 of Figure 1.

As shown in Figure 1, the tractor or draft vehicle to which the spreader is connected comprises a tractor having a main body 10 provided with opposite transversely extending axle housings 12, which respectively journal drive axles 14 carrying traction wheels 16. The tractor is provided with a rearwardly extending draft element or draw-bar 18 rigidly connected to attaching plates 20 mounted respectively on the axle housings 12.

The particular type of spreader chosen for purposes of illustration includes a main body 22 having opposite, longitudinally extending side walls 24 and a rearwardly and downwardly inclined front wall 26. The spreader includes at its rear end the conventional spreading mechanism, not shown, cooperating with the conventional spreader conveyer generally indicated at 28. The improved front end or forecarriage construction includes a pair of forwardly extending supports in the form of rigid plate members 30 rigidly carried respectively by the opposite side walls 24 of the body 22, the plates extending forwardly from the body and providing, with the inclined front wall 26, a substantially enclosed housing space 32, the purposes of which will presently appear. A transverse bolster member 34, preferably tubular in cross section, is disposed across the front end of the body parallel and in close proximity to the inclined front wall 26, the member being rigidly secured respectively at opposite ends to the inner faces of the forwardly extending supporting plates 30. A longitudinal drive shaft 36 is disposed alongside one side wall 24 and is suitably journaled adjacent its forward end in a bracket or supporting member 38 rigidly carried by the respective supporting plate 30. A sprocket 40 is carried by the shaft 36 forwardly of the bracket 38. The rearward end of the shaft 36 is appropriately associated with the spreading mechanism, not shown.

The transverse bolster member 34 rigidly carries intermediate its ends a vertically disposed journal member 42. This member is preferably carried between a pair of transversely spaced plate members 44 and 46, welded or otherwise rigidly carried by the bolster member 34. The journal member 42 is generally tubular in cross section and is provided with attaching portions 48, which are secured by bolts 50 to the plate members 44 and 46. The plate member 46 is extended farther forwardly than the plate member 44, including thereon a forward attaching portion 52, which serves to support one end of a transverse plate or member 54 comprising part of a bearing support 56. The support 56 is in the form of a longitudinally extending sleeve and serves to journal a stub shaft 58 carrying at its rear end a drive sprocket 60 connected by a drive chain 62 to the drive sprocket 40 on the longitudinally extending shaft 36. The other end of the bearing support 56 is carried by an additional plate member 64 rigidly carried by the transverse bolster member 34 and spaced transversely from the plate member 46. The end of the bearing supporting plate 54 which is carried by the portion 52 on the member 46 is provided with a transversely extending slot 66, through which a bolt 68 is passed for adjustably securing these parts together. The other end of the bearing supporting plate 54 is similarly provided with a slot 70, through which a bolt 72 is passed for securing that end of the plate to the supporting plate 64 on the transverse bolster member 34. The member 64 additionally carries means for adjusting the bearing supporting member 56 transversely in order to adjust the drive chain 62. This means comprises an angle member 74 rigidly carried by the member 64 and through which is threaded an adjusting screw 76 engaging the end of the bearing supporting plate 54. The bearing support may thus be adjusted by loosening the bolts 68 and 72 and adjusting the adjusting screw 76.

The vertical journal member 42 has journaled therein a vertical standard 78 of a caster wheel construction which includes a pneumatic-tired caster wheel 80 journaled on a transverse axis 82 provided in a wheel yoke member 84 carried at the lower end of the standard 78. It will be noted that the vertical center line of the standard 78 is disposed forwardly of and in close proximity to the transverse center line of the tubular bolster member 34 and that the wheel yoke 84 extends rearwardly in the direction of the forward inclined wall 26 of the spreader body 22, thus disposing the transverse axis 82 of the wheel in a position parallel to and closely rearwardly spaced from a vertical plane passing through the transverse axis of the bolster member 34. This arrangement of parts provides for the disposition of the caster wheel centrally of and substantially within the housing space formed by the forwardly extending supporting plates 30 and the front wall 26 of the spreader body, substantially the greater peripheral portion of the caster wheel 80 lying below the inclined wall 26 and the bolster member 34. The location of the wheel at this rearwardly disposed point adequately supports the front end of the spreader body and is effectively located with respect to the increased weight of the spreader caused by loading thereof. This is especially important since the considerably larger portion of the material to be spread is piled at the forward end of the spreader body and remains there for a comparatively longer period than the material at the rear end of the spreader, since the latter is being continually spread.

The stub shaft 58 journaled in the bearing supporting member 56 is associated through a universal joint 85 with a shaft 86, which, in turn, is connected by a universal joint 88 to a power take-off shaft 90 disposed on the tractor and suitably driven thereby. In this manner, the spreading mechanism is effectively connected through the shafts 36, 58, 86 and through the drive chain 62 to be power operated by the power take-off shaft 90 of the tractor.

The spreader is connected to the draw-bar 18 of the tractor through the medium of a draft means preferably comprising a pair of forwardly extending, converging, tubular draft members 92 connected respectively at their rear ends to the supporting plates 30 on the spreader body 22, and at their forward ends, to a gusset plate 94 pivotally connected by a pin 96 to a central portion of the tractor draw-bar 18. The members 92 are connected to the spreader body independently of the caster wheel 80 and the spreader may be thus easily handled in backing, making short turns, and the like.

It will be seen from the foregoing description that a suitable and preferred construction has been illustrated and described for the purposes of attaining the objects previously set forth. It will be understood, of course, that numerous modifications and alterations may be made in the construction disclosed without departing from the spirit and scope of the invention as defined in the appended claims.

What is claimed is:

1. A front end construction for a material spreader adapted to be connected to a vehicle having a power take-off shaft, said spreader having a main body including a drive shaft extending longitudinally at one side thereof, a pair of forwardly extending supports rigidly carried respectively at opposite sides of the body at the front end thereof, one of said supports serving also to mount the spreader drive shaft, a transverse bolster disposed between the supports and rigidly carried at its opposite ends thereby, a pair of parallel plate members extending forwardly from and rigidly carried by the bolster, one of said plates having a portion thereon extending farther forwardly, a stub shaft carried by said extending portion and adapted to be connected to the power take-off shaft, a driving connection between the stub and drive shafts, a journal member disposed vertically and arranged between said plates and rigidly carried thereby, and a caster wheel supporting the front end of the body and including a vertical standard journaled in the journal member on the bolster.

2. A front end construction for a material spreader having a main body provided with opposite side walls and a downwardly and rearwardly inclined front wall, extension members rigidly carried respectively by the side walls and extending forwardly therefrom, said members and the body front wall providing a substantially enclosed housing space at the front end of the body, a transverse member disposed across the front end of the body in close proximity to the inclined front wall being rigidly connected at its opposite ends to the extension members, a journal member rigidly carried by the transverse member substantially at its center, a vertical standard journaled in the journal member and including a wheel yoke at its lower end extending rearwardly below the transverse member and toward the front body wall, and a wheel journaled in the wheel yoke with substantially its greater peripheral portion below the inclined front wall of the body.

3. A front end construction for a material spreader having a main body provided with opposite side walls and a downwardly and rearwardly inclined front wall, extension members rigidly carried respectively by the side walls and extending forwardly therefrom, said members and the body front wall providing a substantially enclosed housing space at the front end of the body, a transverse tubular member disposed across the front end of the body in close proximity to the inclined front wall, being rigidly secured at its opposite ends to the extension members, a vertical caster wheel standard carried by and centrally of the transverse member, the vertical center line of the standard being closely spaced forwardly of the transverse center line of the tubular member, a wheel yoke carried at the lower portion of the standard and extending rearwardly below the tubular member, said yoke having a transverse wheel axis disposed rearwardly of the transverse center line of the tubular member, and a wheel journaled on the wheel yoke at its axis and having substantially its greater peripheral portion below the inclined front wall of the body.

CLEMMA R. RANEY.
RAYMORE D. MacDONALD.
WILLIAM F. SCHMIED.